(12) United States Patent
Zhou

(10) Patent No.: US 7,222,074 B2
(45) Date of Patent: May 22, 2007

(54) PSYCHO-PHYSICAL STATE SENSITIVE VOICE DIALOGUE SYSTEM

(76) Inventor: Guojun Zhou, 14670 NW. Cornell Rd., Apt. #48, Portland, OR (US) 97229

( * ) Notice: Subject to any disclaimer, the term of this patent is extended or adjusted under 35 U.S.C. 154(b) by 433 days.

(21) Appl. No.: 09/884,423

(22) Filed: Jun. 20, 2001

(65) Prior Publication Data

US 2002/0198707 A1    Dec. 26, 2002

(51) Int. Cl.
*G10L 15/22* (2006.01)
(52) U.S. Cl. ............................ 704/270; 704/257
(58) Field of Classification Search ................ 704/251, 704/254, 257, 260, 270, 275
See application file for complete search history.

(56) References Cited

U.S. PATENT DOCUMENTS

| | | | | |
|---|---|---|---|---|
| 6,144,938 A * | 11/2000 | Surace et al. | ............... | 704/257 |
| 6,185,534 B1 * | 2/2001 | Breese et al. | ............... | 704/270 |
| 6,275,806 B1 * | 8/2001 | Pertrushin | ................... | 704/272 |
| 6,598,020 B1 * | 7/2003 | Kleindienst et al. | ........ | 704/270 |
| 7,085,719 B1 * | 8/2006 | Shambaugh et al. | ........ | 704/251 |

* cited by examiner

*Primary Examiner*—Abul K. Azad
(74) *Attorney, Agent, or Firm*—Michael R. Barre

(57) ABSTRACT

An arrangement is provided to achieve automated voice responding dialogue that is psycho-physical state sensitive. The input speech data from a user is used to detect the psycho-physical state of the user. Spoken words are then recognized from the input speech data based on the detected psycho-physical state of the user. The recognized words form a transcription which is then used to generate a voice response that is appropriate according to the transcription and the psycho-physical state of the user.

16 Claims, 7 Drawing Sheets

PSYCHO-PHYSICAL STATE SENSITIVE VOICE DIALOGUE SYSTEM

RESERVATION OF COPYRIGHT

This patent document contains information subject to copyright protection. The copyright owner has no objection to the facsimile reproduction by anyone of the patent document or the patent, as it appears in the U.S. Patent and Trademark Office files or records but otherwise reserves all copyright rights whatsoever.

BACKGROUND

Aspects of the present invention relate to voice automation systems. Other aspects of the present invention relate to automated spoken dialogue systems.

In a society that is becoming increasingly "information anywhere and anytime", information services emerge everyday to provide different types of information to users around the clock. Examples of such services include weather information and movie information. In the past, information services may be provided through operators or via selection buttons. For example, a user may make a requesting call to a toll free phone number corresponding to a service. If an operator picks up the requesting call, the user may speak to the operator to indicate desired information. The operator may then select the desired information and play back to the user over the phone. If a recording picks up the requesting call, the user may indicate desired information through selection buttons according to the instructions from the recording.

To run a cost effective information service business, companies have made effort to automate the service process. For example, in directory assistance services provided by various phone companies, semi-automated systems have been deployed that maximizes productivity in providing requested information (e.g., phone numbers). Some rail systems in Europe have deployed automated ticket reservation systems that allow customers to reserve train tickets over phone via voice. As another example, "tellme" service in the U.S.A. (1-800-tellme) offers free information services across many categories (e.g., weather, movies, stocks, etc.) over phone via automated voice responses. Such effort has so far decreased the required number of skilled workers and hence the size of the operating facilities, saving service offering company millions of dollars each year.

The automation efforts mentioned above utilize automated speech recognition and language understanding technologies. Spoken dialogue systems are developed based on such technologies to automate service and other systems. A dialog system usually serves as a front end of a service, interacting with a user to understand what is being requested, activating one or more back end systems to retrieve the requested information, and generating voice responses.

Service systems that deploy automated voice based front-end solutions may not always function properly. Such imperfection may be due to various environmental and technological reasons. For example, a user may speak over a phone in a very noisy environment that yields speech data of poor quality. A speech recognition system may not be able to understand speech with an unknown foreign accent. Another related reason for an automated voice based front end to make mistakes is that it is presented with an unusual speech pattern. For example, when a user gets annoyed (e.g., by the previous mistake the system made or by a tedious confirmation process), the user may respond with anger by raising the voice which may corresponds to an unusually high pitch. A user may have nasal congestion due to a cold that may significantly change the acoustic properties of speech.

Dialogue systems can be designed to provide a certain amount of tolerance to imperfections. Such tolerance may be achieved using different strategies. For example, a dialogue system may employ "confirmation" strategy. A dialogue system may also navigate using prompts. While these strategies may reduce the chance of making mistakes, the "confirmation" strategy may be tedious to a user and it does not always work. The strategy of "navigate using prompts" provides little flexibility for users to browse at will.

A fair number of users fail to make use of automated voice based services. In addition to the above mentioned technological and environmental reasons, one important contributing factor may also be that these users simply give up when an automated dialogue system makes mistakes without realization or being apologetic. It is particularly true when a user raises his voice to express dissatisfaction that only further triggers a dialogue system to either repeat the same mistake or make even more mistakes.

BRIEF DESCRIPTION OF THE DRAWINGS

The present invention is further described in terms of exemplary embodiments, which will be described in detail with reference to the drawings. These embodiments are non-limiting exemplary embodiments, in which like reference numerals represent similar parts throughout the several views of the drawings, and wherein.

DETAILED DESCRIPTION

The invention is described below, with reference to detailed illustrative embodiments. It will be apparent that the invention can be embodied in a wide variety of forms, some of which may be quite different from those of the disclosed embodiments. Consequently, the specific structural and functional details disclosed herein are merely representative and do not limit the scope of the invention.

The processing described below may be performed by a general-purpose computer alone or by a special purpose computer or by a combination thereof. Such processing may be performed by a single platform or by a distributed processing platform. In addition, such processing and functionality can be implemented in the form of special purpose hardware or in the form of software being run by a general-purpose computer. Any data handled in such processing or created as a result of such processing can be stored in any memory as is conventional in the art. By way of example, such data may be stored in a temporary memory, such as in the RAM of a given computer system or subsystem. In addition, or in the alternative, such data may be stored in longer-term storage devices, for example, magnetic disks, rewritable optical disks, and so on. For purposes of the disclosure herein, a computer-readable media may comprise any form of data storage mechanism, including such existing memory technologies as well as hardware or circuit representations of such structures and of such data.

Figure 1:
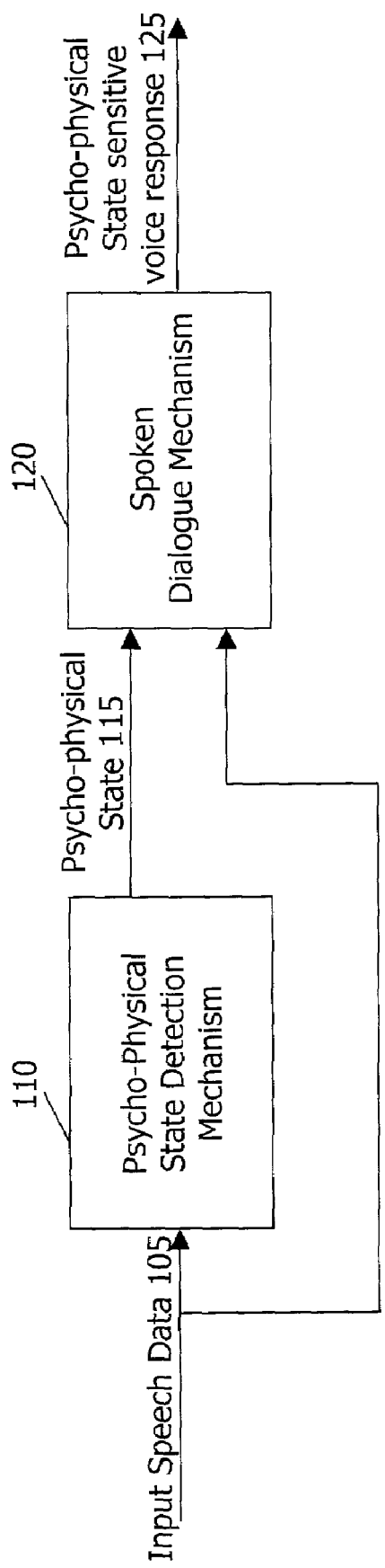
FIG. 1 is a high level system architecture of embodiments of the present invention.

FIG. 1 is a high level system architecture of embodiments of the present invention. In FIG. 1, a psycho-physical state sensitive spoken dialogue system 100 comprises a psycho-physical state detection mechanism 110 and a voice responding dialogue mechanism 120. The psycho-physical state detection mechanism 110 takes the speech of a user as input speech data 105 and detects the psycho-physical state 115 of the user from the input speech data 105. Such detected psycho-physical state 115 is used by the voice responding dialogue mechanism 120 to generate a psycho-physical state sensitive voice response 125.

The input speech data 105 may be in waveform with certain frequency and sampling rate. The input speech data 105 may be transmitted in either analog or digital form across a corresponding network. For example, speech data in its analog form may be transmitted across a telephone network. Speech data in its digital form may be transmitted across a packet switched network such as the Internet. The data transmission process across a network may introduce additional noise to the speech data. In FIG. 1, the input speech data 105 is used by the voice responding dialogue mechanism to recognize the words that are spoken. In addition, the input speech data 105 is also used by the psycho-physical state detection mechanism 110 to determine the psycho-physical state of the user.

The psycho-physical state 115 may include mental stress or physical stress. For example, anger may be considered as mental stress and cold may be considered as physical stress. The psycho-physical state of a user may affect the acoustic properties of the user's speech. For example, when a user is mentally stressed (e.g., angry), the loudness or the speed of the speech may increase. Acoustically, such increase may be correlated with the rise of the pitch of the voice. Similarly, physical stress may cause changes in the acoustic properties of speech. For example, a cold may cause nasal congestion that consequently may cause the spectral characteristics of speech to change.

A speech recognizer recognizes spoken words based on the acoustic properties of the speech. Generic acoustic models are typically generated using speech from people who are not under psycho-physical stress. When the acoustic properties change, the recognition rate of the speech recognizer may suffer.

A spoken dialogue system interacts with a user to perform tasks. For example, a voice portal system may provide information requested by the user. Such a voice dialogue system usually generates voice responses based on what the user says without considering the psycho-physical state of the user. Such generated voice responses may become inappropriate or even annoying when the user is under certain stress. The interaction between a user and a voice dialogue system may be improved if the voice response from the voice dialogue system is generated according to the psycho-physical state of the user. For example, a psycho-physical state sensitive voice dialogue system may generate a response that is more helpful when it detects, from the user's voice, that the user sounds upset.

There are many ways to detect the psycho-physical state of a person. For example, anger may be detected from a person's facial expression or physical gesture. In the present invention, the psycho-physical state detection mechanism 110 detects the psycho-physical state 115 from the voice of a person (e.g., from the input speech data 105). Such detection may be based on the acoustic characterizations of a person's voice under different psycho-physical states. Details will be discussed with reference to FIG. 5 and FIG. 6.

In FIG. 1, the voice responding dialogue mechanism 120 takes both the input speech data 105 and the detected psycho-physical state 115 as input. To generate a response that is appropriate to the input, the voice responding dialogue mechanism 120 recognizes what the user says and then generates an appropriate voice response. Both the recognition and the generation of the response may be performed according to the psycho-physical state of the user. For example, an acoustic model that characterizes the distinct acoustic properties correlated with a particular psycho-physical state may be selected for recognition purposes.

A response generated by the spoken dialogue system 120 may also be constructed according to the psycho-physical state of the user. Certain words that are appropriate to a detected psycho-physical state may be used to form a response. For example, sentence like "I am sorry that you do not feel well" may be generated in a response when nasal congestion is detected from a user's voice. The voice of a generated response may also be synthesized using certain prosodic pattern so that the voice of the response yields an effect that is appropriate to the detected psycho-physical state. For instance, the loudness and the speed of the above response "I am sorry that you do not feel well" may be decreased so that the response, when being said, sounds sympathetic.

Figure 2:
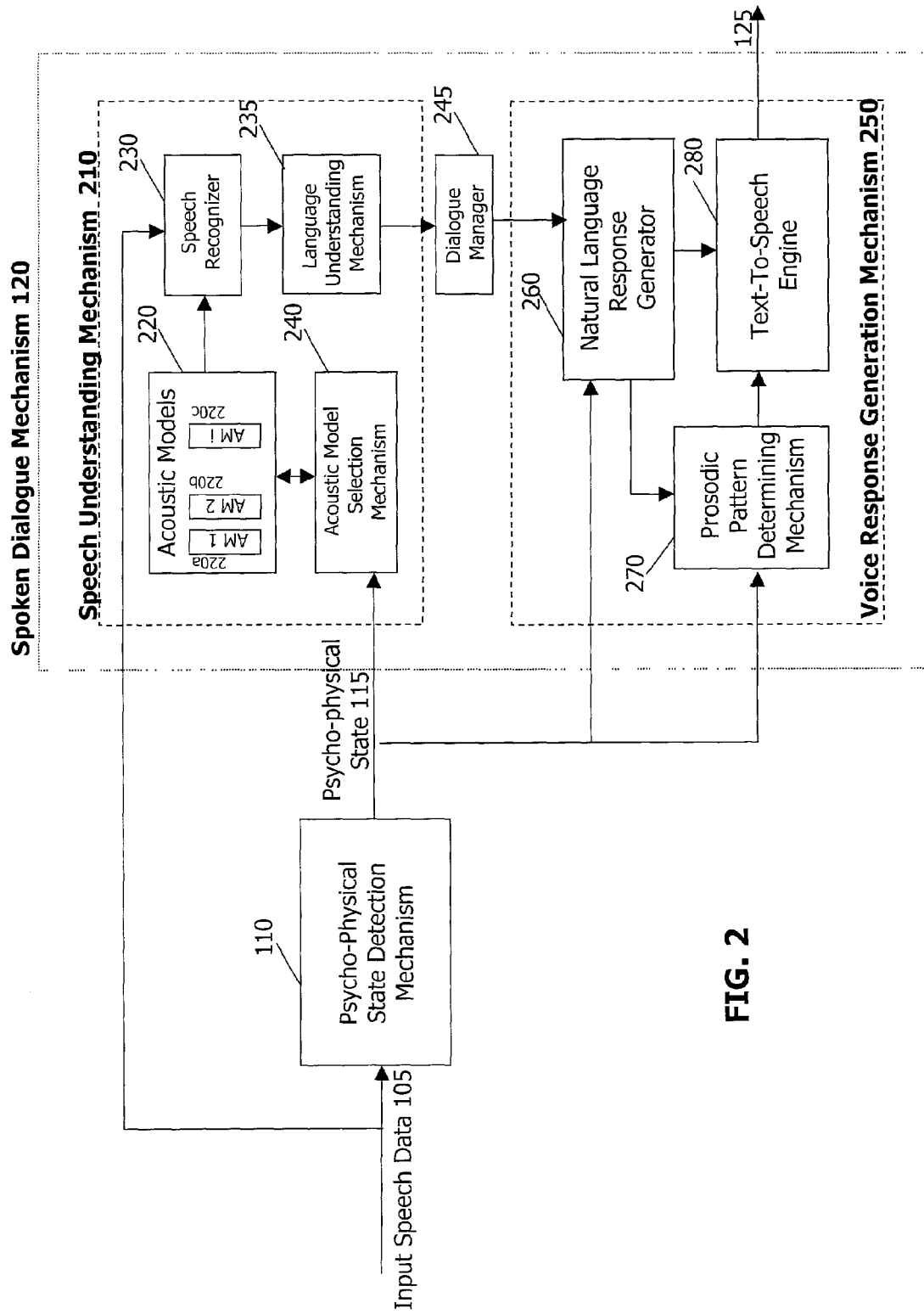
FIG. 2 depicts the internal structure of a psycho-physical state sensitive spoken dialogue system.

FIG. 2 depicts the internal structure of the spoken dialogue mechanism 120 and how it interacts with the psycho-physical state detection mechanism 110. The spoken dialogue mechanism 120 comprises a speech understanding mechanism 210, which understands the spoken words from the input speech data 105. A dialogue manager 245 controls a dialog based on the understood spoken words. A voice response generation mechanism 250 generates a voice response under the control of the dialogue manager 245. Both the speech understanding mechanism 210 and the voice response generation mechanism 250 perform their tasks according to the psycho-physical state 115, detected by the mechanism 110.

The speech understanding mechanism 210 includes a plurality of acoustic models 220 comprising acoustic model 1, 220a, acoustic model 2, 220b, . . . , acoustic model i, 220c . . . . An acoustic model selection mechanism 240 selects, based on the detected psycho-physical state of the user, appropriate acoustic models to be used in recognizing the spoken words from the input speech data 105. A speech recognizer 230 utilizes the selected acoustic models 220 to recognize spoken words from the input speech data 105. A language understanding mechanism 235 that understands the literal meaning of the recognized spoken words.

The voice response generation mechanism 250 comprises a natural language response generator 260, a prosodic pattern determining mechanism 270, and a Text-To-Speech (TTS) engine 280. Under the control of the dialogue manager 245, the natural language response generator 260 takes the information required for the desired action and constructs a response in natural language (in text form). As discussed earlier, the response may be constructed based on the psycho-physical state 115, detected from the input speech data 105. One example is to add a sentence such as "I am sorry that you do not feel well" to a response when nasal congestion is detected from the input speech data 105.

In FIG. 2, the TTS engine 280 synthesizes the voice of the generated natural language response. Different parameters may be applied in synthesizing voice based on text. For example, pitch of the artificial voice may be tuned lower or higher (women in general have higher pitch than men). Certain words in a sentence may be emphasized (e.g., please put your hat on TOP of the dresser) or softened (e.g., how do you FEEL?). The intonation of the last word in a question sentence may be raised (e.g., have you done that YET?). Such parameters are generally referred to as prosodic patterns and may be set according to different needs.

In the psycho-physical state sensitive spoken dialogue system 100, a voice response is synthesized according to the detected psycho-physical state of the user. For example, an apologetic tune may be used to synthesize a response when the system 100 detects that the user is angry. Users of a spoken dialogue system may become frustrated or even angry when the system misunderstands what is being said (e.g., spoken word "stocks" may be wrongly recognized as "sports" and a user may raise voice to express dissatisfaction). In this case, adopting an apologetic tune may help the user to remain calm and stay on-line.

In FIG. 2, to generate a voice response that is appropriate to the psycho-physical state of the user, the prosodic pattern determining mechanism 270 takes both the text response (generated by the natural language response generator 260) and the psycho-physical state as input and determines the prosody to be applied to the corresponding voice response. The psycho-physical state sensitive voice response 125 is generated by the TTS engine 280 by synthesizing the text response using the prosodic pattern selected by the prosodic pattern determining mechanism 270.

Figure 3:
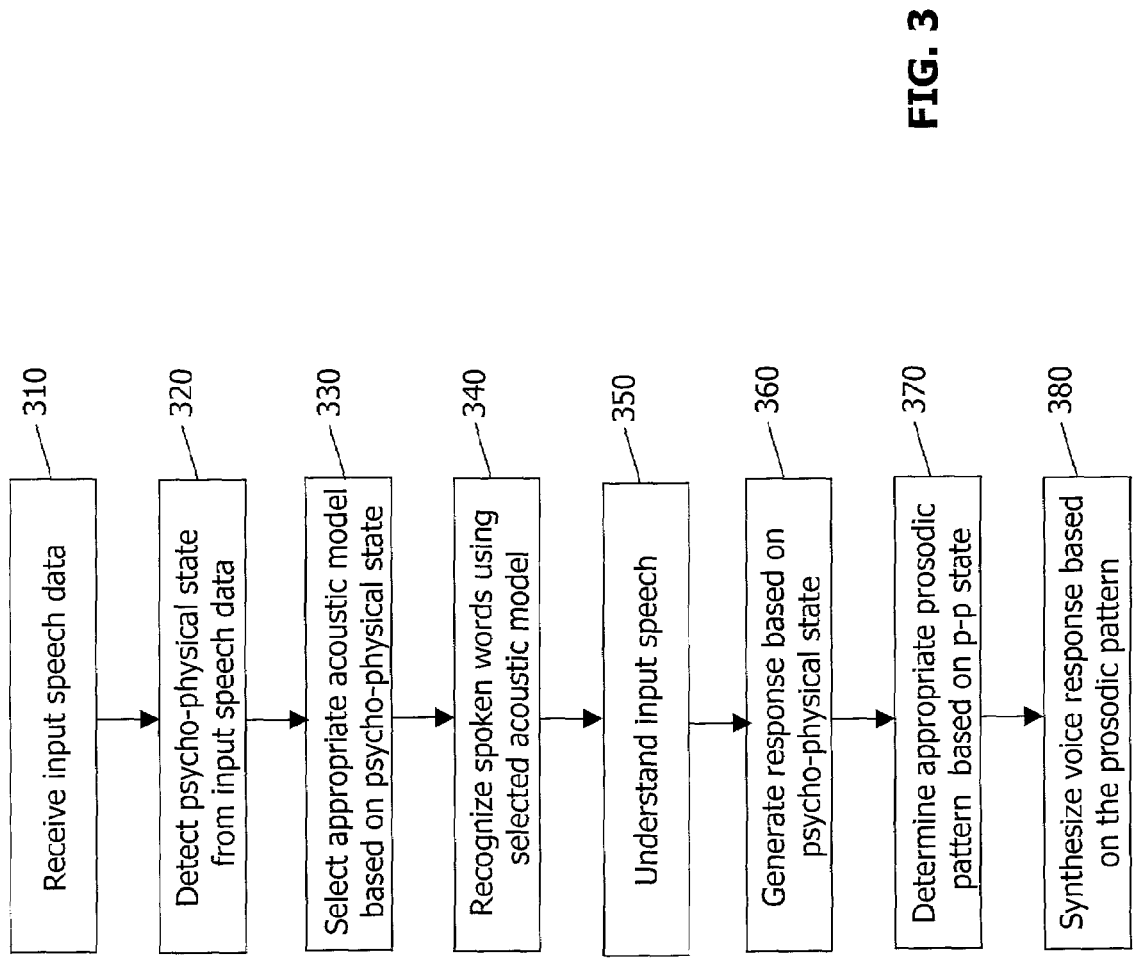
FIG. 3 is an exemplary flowchart of a process, in which a spoken dialogue system carries out a voice dialogue with a user based on the psycho-physical state of the user.

FIG. 3 is an exemplary flowchart of a process, in which the psycho-physical state sensitive spoken dialogue system 100 carries out a dialogue with a user based on the psycho-physical state of the user. The input speech data 105 is received first at act 310. Based on the input speech data 105, the psycho-physical state detection mechanism 110 detects, at act 320, the current psycho-physical state of the user. For example, the detection mechanism 110 may determine that the user is frustrated (may due to some misunderstood dialogue) and such a decision may be concluded according to the acoustic characteristics of the input speech data 105.

Based on the detected psycho-physical state 115, the acoustic model selection mechanism 240 selects, at act 330, one or more acoustic models that characterize the acoustic properties correlated with the detected psycho-physical state. The speech recognizer 230 then recognizes, at act 340, spoken words from the input speech data 105 using such chosen acoustic models. The language understanding mechanism 235 further analyzes the spoken words to understand, at act 350, the literal meaning of the spoken words. The literal meaning of the spoken words may correlate to desired actions.

The understood literal meaning of the spoken words is used to generate, at act 360, a natural language response that is appropriate with respect to both the desired actions and the psycho-physical state of the user. In addition, the prosodic pattern, that is to be used to synthesize the voice of the response and that is appropriate to the psycho-physical state 115, is determined at act 370. Using both the natural language response and the chosen prosodic pattern, the TTS engine 280 then synthesizes, at act 380, the corresponding voice response.

Figure 4:
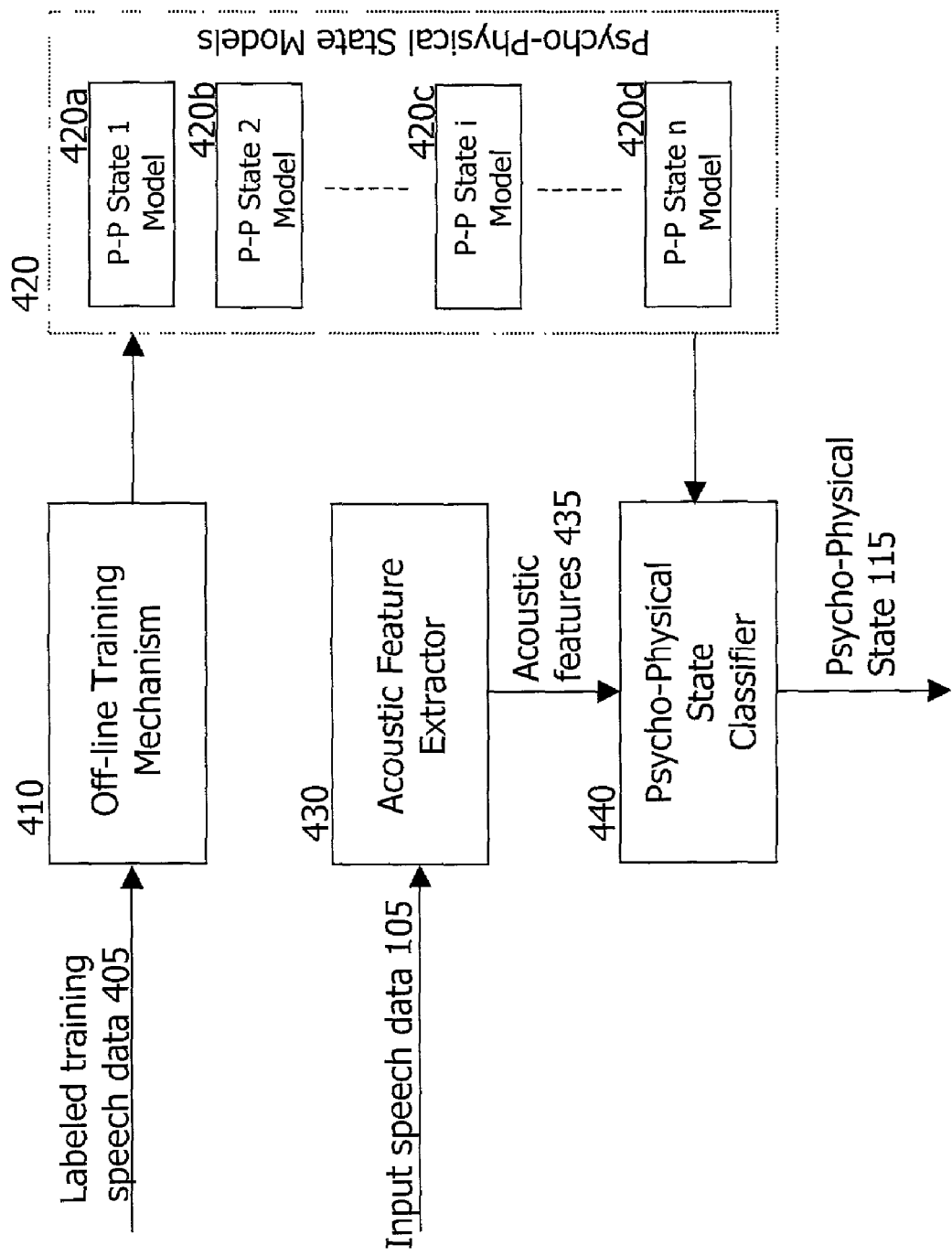
FIG. 4 depicts a high level functional block diagram of a psycho-physical state detection mechanism.

FIG. 4 depicts a high level functional block diagram of the psycho-physical state detection mechanism 110. An exemplary supervised psycho-physical state detection mechanism is described that includes a plurality of psycho-physical state models 420 comprising psycho-physical (p-p) state 1 model, 420a, psycho-physical state 2 model, 420b, . . . , psycho-physical state i model, 420c, . . . , and psycho-physical state n model, 420d. An off-line training mechanism 410 establishes psycho-physical state models. An acoustic feature extractor 430 extracts acoustic features 435 from the input speech data 105. A psycho-physical state classifier 440 determines the psycho-physical state of a user based on the acoustic features 435 extracted from the speech of the user.

The exemplary psycho-physical state detection mechanism 110 shown in FIG. 1 has two functionally distinct parts. One part corresponds to off-line training of psycho-physical state models. The other part corresponds to on-line classification of psycho-physical states. The off-line training may be activated prior to the on-line classification to establish models for different psycho-physical states. A model for a particular psycho-physical state may be constructed based on some distinct (comparing to other psycho-physical state) and relatively invariant (comparing to different speakers in the same psycho-physical state) acoustic properties detected from training speech data corresponding to different people under the same psycho-physical state.

During the off-line training, labeled training speech data 405 is fed into the off-line training mechanism 410. The labeled training speech data 405 may include different segments of speech, each may be labeled by certain psycho-physical state. For example, a segment of training speech data may be labeled as "angry" while a different segment may be labeled as "nasal congestion".

In the labeled training speech data 405, there are usually multiple pieces of speech segments with a same label. Each of the segments in this group of training data may correspond to a different speaker. Together, the group (of training data with the same label) may provide information about relatively invariant acoustic properties that correlate with the labeled psycho-physical state. For example, to build a model for "nasal congestion", training speech data from different people (e.g., different men and different women) who are all "nasal congested" may be used to learn the relatively invariant acoustic properties correlated to "nasal congestion". The construction of the psycho-physical state models may also be done through adapting some general acoustic models (may be trained with data in a normal psycho-physical state). Use of adaptation method may become necessary because of lack of sufficient amount of training data in a specific psycho-physical state.

The psycho-physical state models may be constructed based on a set of acoustic features. Exemplary acoustic features used to construct a psycho-physical state model may include pitch and critical band partitioned Teager Energy Operator (TEO) autocorrelation envelope. The details about the TEO autocorrelation envelop are described in an article, entitled "Nonlinear Features for Classification and Assessment of Speech Under Stress", by G. Zhou, J. H. L. Hansen, and J. F. Kaiser and published on IEEE Transactions on Speech and Audio Processing, Vol. 9, No. 3, March 2001, pp. 201–216.

Such features form a feature space. The off-line training mechanism 410 may construct psycho-physical state models in such a way that, in the feature space, different models are far apart and, at the same time, each model is invariant with respect to different speakers. Constructed psycho-physical models may represent the underlying psycho-physical states using the average or centroid of the distribution of the acoustic feature vectors computed from the training data 405.

During on-line classification, the input speech data 105 is fed into the acoustic feature extractor 430 that computes the corresponding acoustic features that are used to construct the psycho-physical state models during off-line training. The acoustic feature vector computed from the on-line input speech data 105 may then be used by the psycho-physical state classifier 440 to identify the current psycho-physical state of the speaker (or user). Such classification may be achieved by comparing the on-line computed feature vector with each of the psycho-physical state models and a psycho-physical state whose model yields a maximum similarity (e.g., minimum distance between the on-line measured feature vector and a psycho-physical state model in the feature space) with the on-line computed feature vector may be identified as the current psycho-physical state. The psycho-physical state classifier 440 may be implemented based on well-known maximum likelihood principle or other existing pattern recognition techniques.

Figure 5:
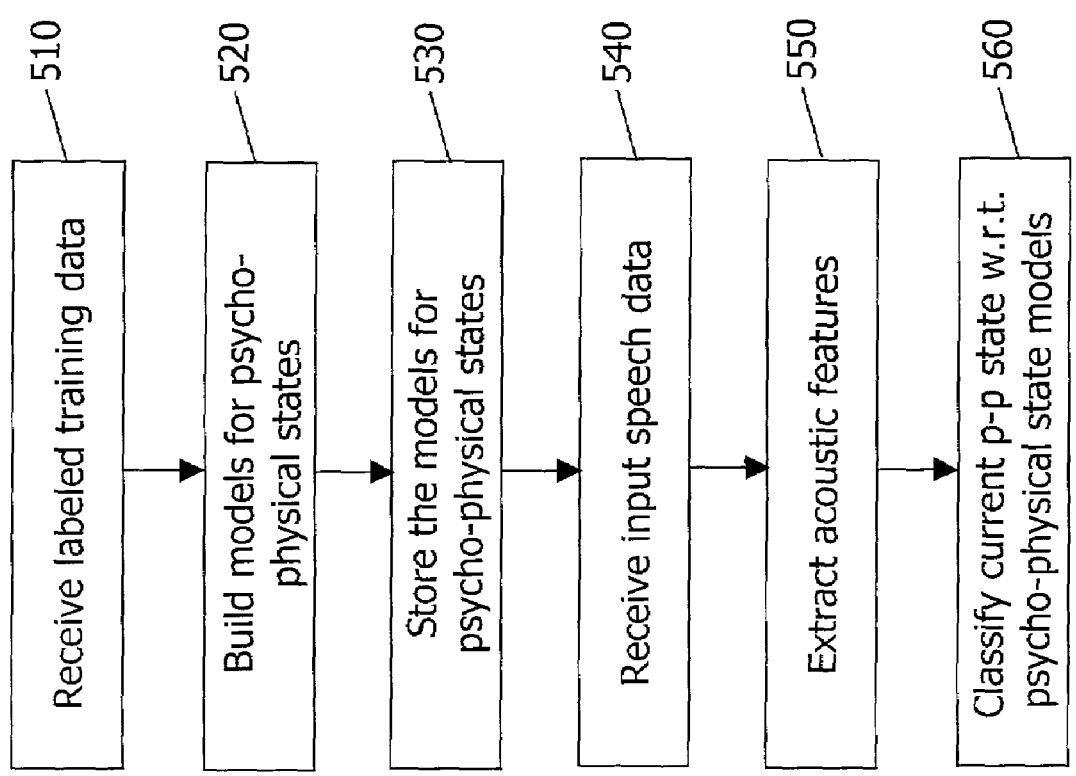
FIG. 5 is an exemplary flowchart of a process, in which the psycho-physical state of a user is detected based on the speech of the user.

FIG. 5 is an exemplary flowchart of a process, in which the psycho-physical state of a user is determined based on the voice of the user. During off-line training, labeled training speech data 405 is first received at act 510. The training speech data 405 includes segments of speech data labeled with different psycho-physical states. Models for such labeled psycho-physical states are built, at act 520 and are stored at act 530 for on-line classification purposes.

During on-line processing, the input speech data 105 is received at act 540. The acoustic features 435, that are used to build psycho-physical state models, are extracted, at act 550, from the input speech data 105. Such on-line extracted acoustic features are then used, at act 560, to classify the current psycho-physical state of the user with respect to the stored psycho-physical state models 420.

Figure 6:
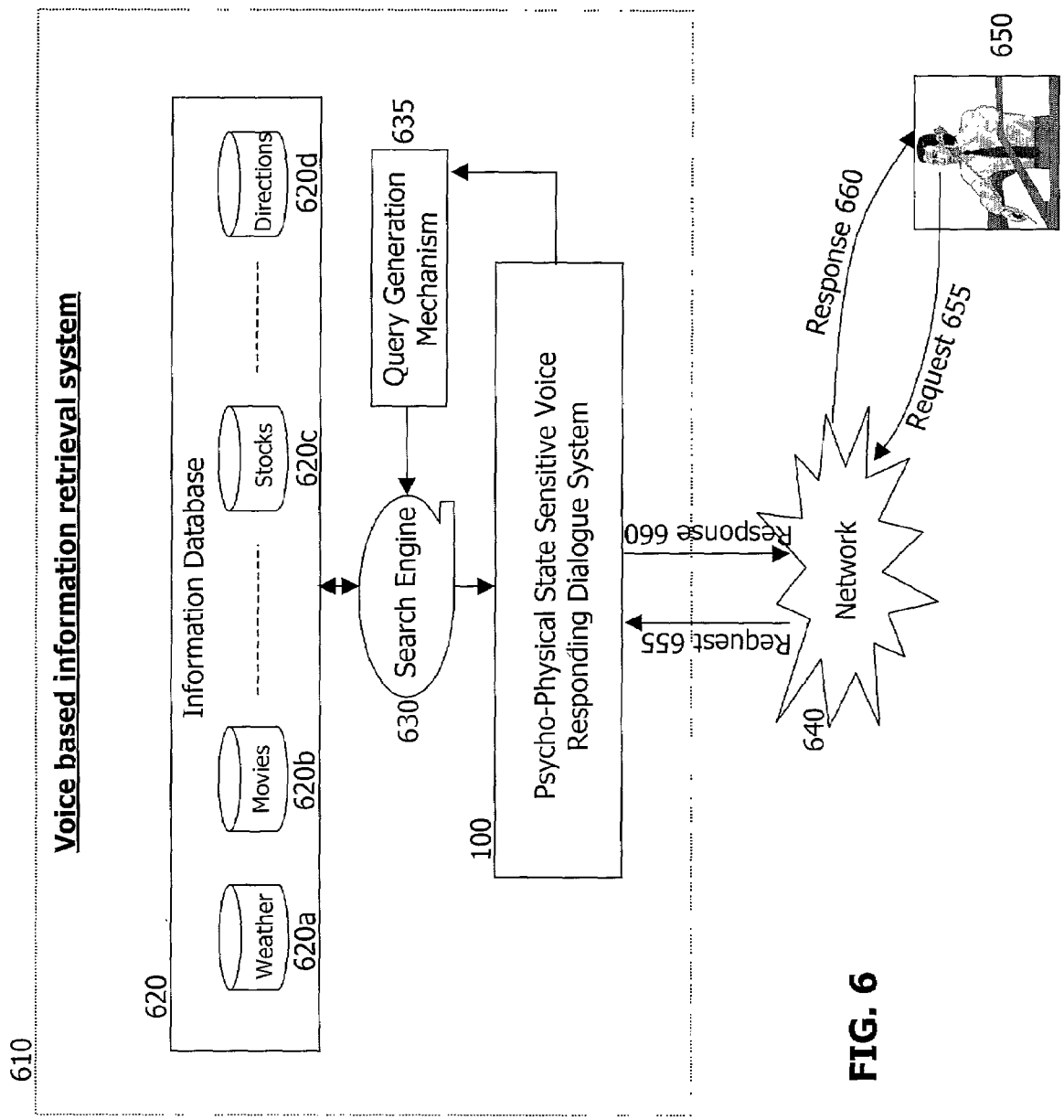
FIG. 6 is the high level architecture of different embodiments of the present invention, in which a psycho-physical state sensitive spoken dialogue system is utilized to facilitate voice based information retrieval.

FIG. 6 is a high level architecture of different embodiments of the present invention, in which a psycho-physical state sensitive spoken dialogue system is utilized to facilitate voice based information retrieval. The voice based information retrieval system 610 represents a generic information retrieval mechanism that is enabled by voice communications. For example, it may correspond to a voice portal that provides information of different domains of interest. It may also correspond to a voice enabled web surfing system that allows a user to browse web content via voice commands.

A voice based information retrieval system 610, as depicted in FIG. 6, interacts with a user 650 through a network 640 which is representative of a wide range of communications networks in general. For example, network 640 may correspond to the Internet or a wireless network.

The user 650 interfaces with the voice based information retrieval system 610 via the psycho-physical state sensitive spoken dialogue system 100. The psycho-physical state of the user 650 is detected and used appropriately throughout the course of the dialogue to facilitate smooth, productive, and successful voice communication.

In FIG. 6, the user 650 may request certain information, by issuing a voice request 655 to the voice based information retrieval system 610. For example, the user may request driving directions from one location to another. To generate an appropriate response (660), the psycho-physical state sensitive spoken dialogue system 100 recognizes the voice request 650 and sends the request to a query generation mechanism 635. The query generation mechanism 635 then generates a query request according to the request 655 and activates a search engine 630 to retrieve the requested information from an information database 620. The retrieved information is then returned to the user 650 in the form of a voice response.

To understand the request 655 correctly and to return correct information, it may take several iterations between the user 650 and the psycho-physical state sensitive spoken dialogue system 100. That is, there may be multiple rounds of request and response before the requested information is correctly returned as the 660 response. During the iteration, the psycho-physical state of the user 650 may change. For example, the user may become impatient or annoyed when the request 655 is misunderstood (especially when the request is misunderstood more than once). The spoken dialogue system 100 may continuously adapt, according to the detected psycho-physical state of the user 650, both the linguistic and acoustic styles of its responses to facilitate a more productive and pleasant experience for the user 650.

In FIG. 6, the psycho-physical state sensitive spoken dialogue system 100 may serve as a front-end of the voice based information retrieval system 610. In the exemplary embodiments described in FIG. 6, the voice request 655 may have to be converted into a standard query in order to utilize the search and retrieval capabilities of a commercially available database. For example, if the information database 620 is realized using an Oracle database, a query constructed according to Structured Query Language (SQL) may need to be issued to the search engine 630 that supports the search and retrieval of an Oracle database.

In FIG. 6, the dialogue system 100 may send the transcription of the request 655 to the query generation mechanism 635 to convert the user's request into a standard query. Such a query, once generated, is sent to the search engine 630 to retrieve the requested information from the information database 620.

In FIG. 6, the information database 620 may represent a single database (not shown in FIG. 6) or a collection of databases, each of which may store information related to certain domain of interest. For example, the information database 620 of a voice portal may include a plurality of databases 620*a*, 620*b*, . . . , 620*c*, . . . , 620*d*, corresponding to the storage for weather related information (620*a*), movie related information (620*b*), stock information (620*c*), or driving direction related information (620*d*), respectively. These databases may also be distributed.

Once the requested information is retrieved, it may be returned from the search engine 630 to the psycho-physical state sensitive spoken dialogue system 100. The retrieved information may be returned in text form or may be encoded. The psycho-physical state sensitive spoken dialogue system 100 transforms the returned information (in text form) into a voice response 660 based on the detected psycho-physical state of the user. For example, if the user 650 is detected frustrated (e.g., due to several rounds of misinterpretation of the request 655), the psycho-physical state sensitive spoken dialogue system 100 may insert (e.g., prior to returning the voice response) an apologetic sentence spoken in an apologetic tune (e.g., "I am very sorry that it took so long").

Figure 7:
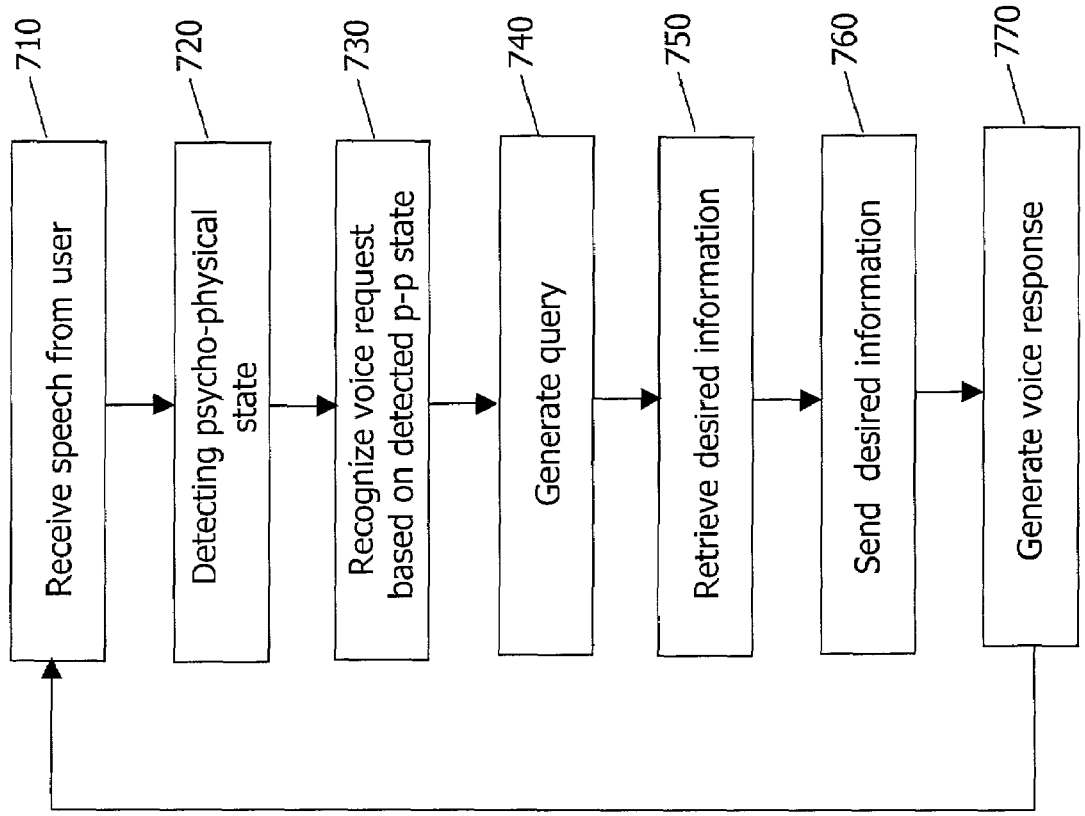
FIG. 7 is an exemplary flowchart of a process, in which a voice based information retrieval system interacts with a user in a psycho-physical state sensitive manner. (There should be a feedback connection from 750 to 740 where the p.p. state detection is applied.)

FIG. 7 is an exemplary flowchart of a process, in which the voice based information retrieval system 610 interacts with a user in a psycho-physical state sensitive manner. In FIG. 7, the input speech data 105 is first received from the user 650 at act 710. The input speech data 105 is transmitted to the dialogue system 100 via the network 640 and corresponds to the request 655 that requests for some desired information.

Based on the input speech data 105, the psycho-physical state of the user 650 is detected at act 720 and the user's request 655 is recognized, at act 730, using the detected psycho-physical state. The recognized request is sent to the query generation mechanism 635 to construct a query at act 740. The constructed query is sent to the search engine 630 to retrieve the desired information. Based on the query constructed based on recognized request, the search engine 630 retrieves, at act 750, the desired information from the information database and sends, at act 760, the retrieved information to the dialogue system 100. Upon receiving the desired information, retrieved from the information database 620 based on the user's request 650, the psycho-physical state sensitive voice responding dialogues system 100 generates, at act 770, the response 660 which is generated and synthesized in such a way that the response 660 is both linguistically and acoustically adjusted according to the detected psycho-physical state of the user 650.

While the invention has been described with reference to the certain illustrated embodiments, the words that have been used herein are words of description, rather than words of limitation. Changes may be made, within the purview of the appended claims, without departing from the scope and spirit of the invention in its aspects. Although the invention has been described herein with reference to particular structures, acts, and materials, the invention is not to be limited to the particulars disclosed, but rather extends to all equivalent structures, acts, and, materials, such as are within the scope of the appended claims.

What is claimed is:

1. A system, comprising:
   a psycho-physical state detection mechanism for detecting a psycho-physical state of a user based on input speech data from the user;
   a spoken dialogue mechanism for carrying on a dialogue with the user based on the psycho-physical stale of the user, detected by the psycho-physical detection mechanism from the input speech data from the user;
   a speech understanding mechanism for understanding the input speech data from the user based on the psycho-physical state of the user to generate a literal meaning of the speech data; and
   a voice response generation mechanism for generating a voice response to the user based on the literal meaning of the input speech data and the psycho-physical state of the user, wherein the voice response to the user is linguistically and acoustically adjusted according to the detected psycho-physical state of the user.

2. The system according to claim 1, wherein the speech understanding mechanism comprises:
   at least one acoustic model for characterizing acoustic properties of the input speech data, each of the at least one acoustic model corresponding to some distinct characteristic related to a psycho-physical state of a speaker;
   an acoustic model selection mechanism for selecting an acoustic model that is appropriate to according to the psycho-physical state detected by the psycho-physical state detection mechanism;
   a speech recognizer for generating a transcription of spoken words recognized from the input speech data using the acoustic model selected by the acoustic model selection mechanism; and
   a language understanding mechanism for interpreting the literal meaning of the input speech data based on the transcription.

3. The system according to claim 1, wherein the voice response generation mechanism comprises:
   a natural language response generator for generating a response based on an understanding of the transcription, the response being generated appropriately according to the psycho-physical state of the user; a prosodic pattern determining mechanism for determining a prosodic pattern to be applied to the response that is considered as appropriate according to the psycho-physical state; and
   a text-to-speech engine for synthesizing the voice response based on the response and the prosodic pattern.

4. The system according to claim 1, wherein the psycho-physical state detection mechanism comprises:
   an acoustic feature extractor for extracting acoustic features from the input speech data to generate at least one acoustic feature; and
   a psycho-physical state classifier for classifying the input speech data into one or more psycho-physical states based on the at least one acoustic feature.

5. The system according to claim 4, further comprising:
   at least one psycho-physical state model, each of the at least one psycho-physical state model corresponding to a single psycho-physical state and characterizing the acoustic properties of the single psycho-physical state; and
   an off-line training mechanism for establishing the at least one psycho-physical model based on labeled training speech data.

6. The system according to claim 1, further comprising a dialogue manager to control the dialogue flow.

7. A method, comprising:
   receiving, by a psycho-physical state detection mechanism, input speech data from a user;
   detecting a psycho-physical state of the user from the input speech data;
   understanding, by a speech understanding mechanism, a literal meaning of spoken words recognized from the input speech data based on the psycho-physical state of the user, detected by the detecting; and
   generating, by a voice response generation mechanism, a voice response to the user based on the literal meaning of the input speech data and the psycho-physical state of the user, wherein the voice response to the user is linguistically and acoustically adjusted according to the detected psycho-physical state of the user.

8. The method according to claim 7, wherein the detecting comprises:
   extracting, by an acoustic feature extractor, at least one acoustic feature from the input speech data; and
   classifying, by a psycho-physical state classifier and based on said at least one acoustic feature, the input speech data into the psycho-physical state according to at least one psycho-physical state model.

9. The method according o claim 8, further comprising: receiving, by an off-line training mechanism, labeled training data, wherein each of the data items in the labeled training data is labeled by a psycho-physical state; and building the at least one psycho-physical state model using the labeled training data, each of the at least one psycho-physical state model corresponding to a single psycho-physical state and being established based on the data items in the labeled training data that have a label corresponding to the single psycho-physical state.

10. The method according to claim 7, wherein the understanding comprises:

selecting, by an acoustic model selection mechanism, an acoustic model, from at least one acoustic model, that is appropriate to according to the psycho-physical state, detected by the detecting, each of the at least one acoustic model corresponding to some distinct speech characteristic related to the psycho-physical state;

recognizing, by a speech recognizer, the spoken words from the input speech data using the acoustic model, selected by the selecting, to generate a transcription; and interpreting, by a language understanding mechanism, the literal meaning of the spoken words based on the transcription.

11. The method according to claim 7, wherein the generating comprises:

constructing, by a natural language response generator, a natural language response based on an understanding of the transcription, the natural language response being constructed appropriately according to the psycho-physical state of the user;

determining, by a prosodic pattern determining mechanism, a prosodic pattern to be applied to said natural language response, wherein the prosodic pattern is considered to be appropriate according to the psycho-physical state; and synthesizing, by a text-to-speech engine, the voice response based on the natural language response and the prosodic pattern.

12. A computer-readable medium encoded with a program, said program comprising instructions that when executed by a computer cause the computer to:

receive, by a psycho-physical state detection mechanism, input speech data from a user;

detect a psycho-physical state of the user from the input speech data;

understand, by a speech understanding mechanism, a literal meaning of spoken words recognized from the input speech data based on the psycho-physical state of the user; and generate, by a voice response generation mechanism, a voice response to the user based on the literal meaning of the input speech data and the psycho-physical state of the user, wherein the voice response to the user is linguistically and acoustically adjusted according to the detected psycho-physical state of the user.

13. The medium according to claim 12, wherein the to detect comprises instructions that when executed by the computer cause the computer to:

extract, by a acoustic feature extractor, at least one acoustic feature from the input speech data; and classify, by a psycho-physical state classifier and based on the at least one feature, the input speech data into the psycho-physical state according to at least one psycho-physical state model.

14. The medium according to claim 13, further comprising instructions that when executed by the computer cause the computer to:

receive, by an off-line training mechanism, labeled training data, wherein each of the data items in the labeled training data is labeled by a psycho-physical state; and building the at least one psycho-physical state model using the labeled training data, each of the at least one psycho-physical state model corresponding to a single psycho-physical state and being established based on the data items in the labeled training data that have a label corresponding to the single psycho-physical state.

15. The medium according to claim 12, wherein the understanding comprises instructions that when executed by the computer cause the computer to:

select, by an acoustic model selection mechanism, an acoustic model, from at least one acoustic model, that is appropriate according to the psycho-physical state, each of the at least one acoustic model corresponding to some distinct speech characteristic related to a psycho-physical state;

reconize, by a speech recognizer, the spoken words from the input speech data using the acoustic model, to generate a transcription; and interpret, by a language understanding mechanism, the literal meaning of the spoken words based on the transcription.

16. The medium according to claim 12, wherein the to generate comprises instructions that when executed by the computer cause the computer to:

construct, by a natural language response generator, a natural language response based on an understanding of the transcription, the natural language response being constructed appropriately according to the psycho-physical state of the user;

determine, by a prosodic pattern determining mechanism, a prosodic pattern to be applied to the natural language response, wherein the prosodic pattern is considered to be appropriate according to the psycho-physical state; and synthesize, by a text-to-speech engine, the voice response based on the natural language response and the prosodic pattern.

* * * * *